US00RE38260E

(19) United States
(12) Reissued Patent
Wong

(10) Patent Number: US RE38,260 E
(45) Date of Reissued Patent: Oct. 7, 2003

(54) LIGHTER

(75) Inventor: Sam Ming King Wong, Hong Kong (HK)

(73) Assignee: Colibri Corporation, Providence, RI (US)

(21) Appl. No.: 29/126,310

(22) Filed: Jun. 22, 2000

Related U.S. Patent Documents

Reissue of:
(64) Patent No.: Des. 421,150
Issued: Feb. 22, 2000
Appl. No.: 29/095,982
Filed: Nov. 3, 1998

(30) Foreign Application Priority Data

Oct. 14, 1998 (HK) ..... 9811315

(51) LOC (6) Cl. ..... 27-05
(52) U.S. Cl. ..... D27/141
(58) Field of Search ..... D27/139, 141, D27/152–157, 159, 160, 149; 431/253–256, 129, 139, 258, 152

(56) References Cited

U.S. PATENT DOCUMENTS

D348,119 S * 6/1994 Maruyama ..... D27/157
D376,668 S * 12/1996 Maruyama ..... D27/141

FOREIGN PATENT DOCUMENTS

JP 201945 * 11/1961 ..... D27/141

* cited by examiner

*Primary Examiner*—Jennifer Rivard
(74) *Attorney, Agent, or Firm*—Fish & Richardson P.C.

(57) CLAIM

The ornamental design for a lighter, as shown and described.

DESCRIPTION

FIG. 1 is a perspective view of a lighter embodying the new design.
FIG. 2 is a front elevational view of the lighter shown in FIG. 1.
FIG. 3 is a rear elevational view of the lighter shown in FIG. 1.
FIG. 4 is an elevational view of the right side of the lighter shown in FIG. 1, the elevational view of the left side of the lighter being the mirror image of the view shown in FIG. 4.
FIG. 5 is a top plan view of the lighter shown in FIG. 1; and,
FIG. 6 is a bottom plan view of the lighter shown in FIG. 1.
The broken lines in the figures illustrate environmental subject matter and form no part of the claimed design.

1 Claim, 1 Drawing Sheet

Figure 1:
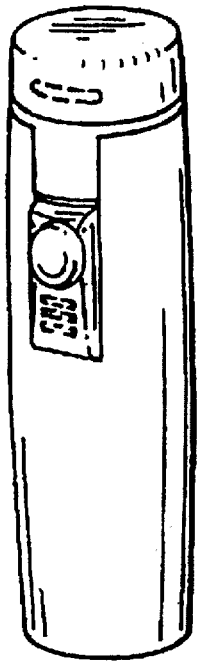
Figure 5:
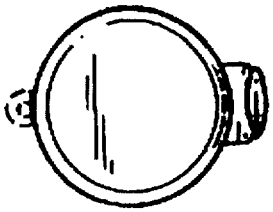
Figure 6:
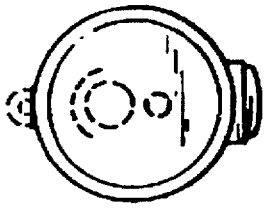
Figure 3:
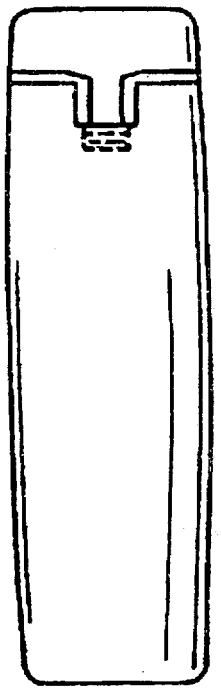
Figure 2:
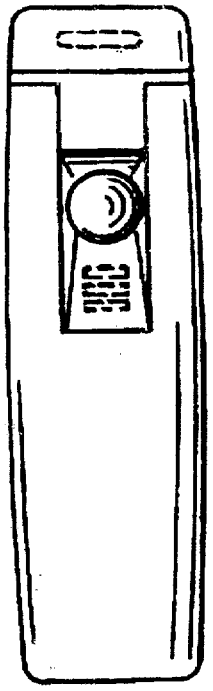
Figure 4:
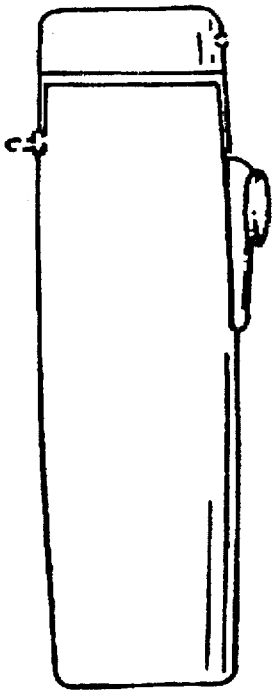

Matter enclosed in heavy brackets [ ] appears in the original patent, but forms no part of this reissue; matter printed in italics indicates the additions made by reissue.